UNITED STATES PATENT OFFICE.

WILLIAM KIEL, OF BUTLER, NEW JERSEY.

VULCANIZED PLASTIC COMPOUND.

SPECIFICATION forming part of Letters Patent No. 430,958, dated June 24, 1890.

Application filed September 30, 1889. Serial No. 325,593. (No specimens.)

*To all whom it may concern:*

Be it known that I, WILLIAM KIEL, a citizen of the United States, residing at Butler, in the county of Morris and State of New Jersey, have invented a certain Improvement in Vulcanized Plastic Compounds, of which the following is a specification.

The object of my invention is to produce a hard vulcanized plastic rubber compound which can be used in the place of hard-rubber or other plastic compounds, wood, bone, ivory, &c., and which possesses valuable qualities hitherto unknown.

The following is a full, clear, and exact description of my invention: The ingredients of my new compound are crude rubber, sulphur, and mineral oil. I obtain excellent results by the use of crude petroleum, or of refined petroleum, known as "kerosene;" but I do not limit myself to the use of any particular mineral oil, or to mineral oil in any particular form. The exact proportions of these ingredients are not invariable, for the reason that the proportions and quantities vary with the results to be obtained.

I preferably use equal weights of sulphur and rubber; but a larger or smaller quantity of sulphur can be used. I do not, however, reduce the sulphur at any time to below approximately eighty per cent. of the rubber by weight.

When using sulphur in a quantity in weight greater than the crude rubber used, I prefer to add to the compound before vulcanization what is known as "rubber-dust" (that is, waste hard-rubber compound ground to a powder) in the proportion of one pound of dust for each pound of sulphur in excess of the weight of the crude rubber.

My new compound can be made either hard and rigid or hard and flexible, and its flexibility depends upon the quantity of mineral oil used and upon the vulcanization to which it is subjected. The proportion of mineral oil used in my new compound varies with the quantity of sulphur and varies in weight from one-fortieth to two-fifths of the weight of the sulphur used.

To produce my new compound in its hard stiff form, I preferably use with the other ingredients mineral oil in weight from one-fortieth to one-fifth of that of the sulphur. To produce it in its more flexible form, I preferably use mineral oil in weight from one-fifth to two-fifths of that of the sulphur.

To prepare my new compound, I preferably mix the mineral oil first with the sulphur in any convenient vessel, and then mix the mass thus obtained with the crude rubber upon heated rollers, such as are commonly used in the manufacture of rubber compounds. When the ingredients are thoroughly united, my new compound is ready to be put into molds or otherwise treated to produce any desired form, and then vulcanized.

To vulcanize my new compound, it is necessary to commence with a pressure or temperature in the vulcanizer not less than that at which the vulcanization of hard rubber usually ends—that is, approximately sixty pounds, corresponding to about 308° Fahrenheit. The pressure during the process of vulcanization is retained constant during the entire process if the vulcanization lasts less than three hours, or it is reduced gradually after the third hour if the vulcanization continues longer than three hours.

Whenever I refer to the "pressure" I mean the pressure of steam in the vulcanizer and the corresponding temperature. Vulcanization by steam heat is the most advantageous method.

To produce my new compound in its hard and rigid form, I proceed as follows: With equal or with approximately equal weights of sulphur and rubber and the proportionate quantity of mineral oil I can vulcanize the ingredients of my new compound for seven hours with an initial pressure of about sixty pounds to the square inch. This pressure is kept constant for three hours, and is then gradually reduced. About seven hours is the longest time necessary for complete vulcanization of my new compound. I can equally advantageously vulcanize the ingredients of my new compound in the above proportions for one hour with an initial pressure of one hundred pounds. This pressure remains constant during the process of vulcanization. It will be seen that I reduce the time of vulcanization at the rate of one and one-half hours for each ten pounds of increased pressure above sixty pounds. I have not found it advantageous to go above one hundred pounds pressure when not using more than approximately equal weights of sulphur and rubber. When the sulphur is greater in weight than the rubber up to about one hundred and fifty per cent., I can vulcanize the ingredients in my new compound for the period of one hour at one hundred pounds pressure. I have not found it practicable to go below this pressure with the ingredients in this proportion. I can increase the pressure and shorten the time until at one hundred and twenty-five pounds pressure the vulcanization lasts but one-half hour.

To produce my new compound as a hard but flexible substance, I proceed as follows: I shorten the time which I have stated is necessary for the production of my new compound as a hard and rigid substance and retain the pressure as before, or I reduce the pressure without shortening the time, or I both reduce the pressure and shorten the time. A pressure of sixty pounds for a period of three hours, or a pressure of eighty pounds for a period of one hour, will produce my new compound in its hard and flexible form when the same proportions of ingredients are used as before; but I do not reduce the pressure at any time below about sixty pounds.

My new compound can be made as hard and rigid as the hardest hard rubber, or hard and flexible to a degree unknown in hard vulcanized-rubber compounds as heretofore made. In its hard and rigid form my new compound is of a rich deep jet-black color throughout, superior to that of hard vulcanized compounds as now usually made, and it is especially superior to such hard vulcanized compounds in that it can be easily and more highly polished than any of such compounds now known. It is at ordinary temperatures far more flexible than the hard vulcanized compounds heretofore made, and when warmed becomes considerably more pliable than such compounds when subject to the same heat. It is less brittle than such compounds, and particularly so when mineral oil is used, and it is always cheaper. It has a different fracture in its being more glassy than that of other hard vulcanized compounds now known. It can be turned upon a lathe with greater facility and with less injury to the tools used than any such compounds. It gives a clean long shaving, and this shows that it possesses qualities which are of the greatest value when nicety and fineness of workmanship upon the lathe are required.

When in the shape of a hard flexible substance, my new compound is so flexible that a rod or tube of it can be bent or twisted into any shape without injury to the material. This would be impossible with a like article of any other known hard vulcanized compound. At the same time it can also be polished, though to a somewhat less degree than my new compound in its hard and rigid shape. It is impervious to moisture, and can be used to great advantage as an insulating substance for electric wires.

By the use of a large proportion of sulphur entering into my new compound I am able to effect a very considerable saving in rubber (which, as is well known, is the most expensive ingredient entering into rubber compounds) without using any foreign solid substance not entering into ordinary hard rubber as now made. At the same time I reduce the time of vulcanization of hard vulcanized compounds as now produced from one-half to one-twelfth of the time now required—a matter of great importance, as it considerably increases the production of the vulcanizers.

I reverse the method applied in the hitherto well-known processes of vulcanizing hard-rubber compounds by beginning the vulcanization at a pressure (or temperature) which is not less than that at which at present vulcanization of hard-rubber compounds ends, and by retaining it constant for not over three hours, and then gradually reducing it. This process, if applied to the manufacture of hard rubber, as now made, produces a porous imperfect article, and in like manner, if the well-known process of manufacturing hard rubber as now made is applied to my new compound, an insufficiently-vulcanized, porous, and non-homogeneous mass is produced.

I am aware of the Letters Patent issued to Franz Wilhoft (No. 321,410, dated June 30, 1885) for an invention which has for its object to produce vulcanized soft rubber in which all the sulphur (not over three and three-fourths per cent.) is chemically combined with the rubber, and which consists, essentially, in exposing the rubber with sulphur to a minimum heat of 330° Fahrenheit. But this is not my invention, and I do not claim it as such; and I am aware that petroleum and some of its products have been used as solvents of rubber, and that petroleum has been used as described in Letters Patent No. 233,600, dated October 26, 1880, to John H. Cheever, in a process of reclaiming rubber from old and waste vulcanized rubber, and utilizing the same in the manufacture of soft-rubber goods. But that again is quite distinct from my invention, and is not claimed by me.

I do not claim the herein-described processes of manufacturing my new compound, as I have filed simultaneously herewith an application for Letters Patent for such processes, Serial No. 325,594, filed September 30, 1889.

What I do claim, and desire to secure by Letters Patent, is—

1. The herein-described hard vulcanized plastic compound, consisting of crude rubber, sulphur, and mineral oil, the sulphur being in the proportion of not less than approximately eighty per cent. of the rubber, by weight, united by vulcanization, substantially as described.

2. The herein-described hard vulcanized plastic compound, consisting of crude rubber, sulphur, and kerosene, the sulphur being in the proportion of not less than approximately eighty per cent. of the rubber, by weight, united by vulcanization, substantially as described.

WILLIAM KIEL.

Witnesses:
JOSEPH F. MCLEAN,
GEO. F. MCLEAN.